United States Patent
Kaufmann et al.

(10) Patent No.: US 9,586,265 B2
(45) Date of Patent: Mar. 7, 2017

(54) GROOVE INSERT, CLAMPING HOLDER FOR A GROOVE INSERT AND GROOVE CUTTING TOOL

(71) Applicants: Igor Kaufmann, Nürnberg (DE); Anwar Sadat Mohideen Abdul, Nürnberg (DE); Franz Havrda, Grossenseebach (DE)

(72) Inventors: Igor Kaufmann, Nürnberg (DE); Anwar Sadat Mohideen Abdul, Nürnberg (DE); Franz Havrda, Grossenseebach (DE)

(73) Assignee: KENNAMETAL INC, Latrobe, PA (US)

(*) Notice: Subject to any disclaimer, the term of this patent is extended or adjusted under 35 U.S.C. 154(b) by 205 days.

(21) Appl. No.: 13/767,026

(22) Filed: Feb. 14, 2013

(65) Prior Publication Data

US 2013/0236256 A1    Sep. 12, 2013

(30) Foreign Application Priority Data

Mar. 9, 2012   (DE) .................. 10 2012 004 804

(51) Int. Cl.
| | |
|---|---|
| *B23C 5/20* | (2006.01) |
| *B23B 27/16* | (2006.01) |
| *B23B 29/04* | (2006.01) |
| *B23B 27/04* | (2006.01) |

(52) U.S. Cl.
CPC .......... *B23B 27/1611* (2013.01); *B23B 27/04* (2013.01); *B23B 29/043* (2013.01); *B23B 2205/02* (2013.01); *Y10T 407/2282* (2015.01); *Y10T 407/24* (2015.01); *Y10T 407/28* (2015.01)

(58) Field of Classification Search
CPC ........... Y10T 407/2286; Y10T 407/229; Y10T 407/194; Y10T 407/205; Y10T 407/1924; B23B 2200/16; B23B 2200/163; B23B 2200/165; B23B 2200/088;
(Continued)

(56) References Cited

U.S. PATENT DOCUMENTS

| | | | |
|---|---|---|---|
| 1,707,903 A | * | 4/1929 | Charlton ........................ 83/845 |
| 2,641,047 A | | 6/1953 | Jackman |
| 3,785,021 A | | 1/1974 | Norgren |

(Continued)

FOREIGN PATENT DOCUMENTS

| | | |
|---|---|---|
| AT | 4597 | 9/2001 |
| AT | 006 939 U1 | 6/2004 |

(Continued)

OTHER PUBLICATIONS

May 22, 2015 Office action (3 months) 1 US 2014-0147219 A1
(Continued)

*Primary Examiner* — Sunil K Singh
*Assistant Examiner* — Ryan Rufo
(74) *Attorney, Agent, or Firm* — Matthew S. Bedsole (57) ABSTRACT

A groove insert to be received in a tool holder has, along its top and bottom side and on its rear side, a holding structure which is formed by holding faces which taper toward one another and by way of which the groove insert is fixed in the tool holder in a positive locking manner. The tool holder has corresponding counter faces. The groove insert and the tool holder form a groove cutting tool.

21 Claims, 7 Drawing Sheets

(58) Field of Classification Search
CPC ...... B23B 2200/321; B23B 2200/3609; B23B 2205/02; B23B 2231/0272; B23B 27/04; B23B 27/045
USPC .............................. 407/109–111, 117, 42, 50
See application file for complete search history.

(56) References Cited

U.S. PATENT DOCUMENTS

| | | | |
|---|---|---|---|
| 3,894,322 A * | 7/1975 | Pano | 407/110 |
| 4,195,956 A | 4/1980 | Mihic | |
| 4,230,428 A * | 10/1980 | Haug | 407/116 |
| 4,417,833 A | 11/1983 | Wertheimer | |
| 4,580,930 A | 4/1986 | Zinner | |
| 4,621,547 A | 11/1986 | Yankoff | |
| 4,645,385 A * | 2/1987 | Keller | 407/105 |
| 4,955,264 A | 9/1990 | Armbrust | |
| 5,022,795 A | 6/1991 | Stampfl et al. | |
| 5,035,545 A | 7/1991 | Zinner | |
| 5,076,738 A | 12/1991 | Pano et al. | |
| 5,085,541 A | 2/1992 | Simpson, III | |
| 5,112,164 A | 5/1992 | Pano | |
| 5,139,371 A | 8/1992 | Kraft | |
| 5,150,992 A | 9/1992 | Friedmann | |
| 5,161,920 A * | 11/1992 | Zinner | 407/110 |
| 5,375,948 A | 12/1994 | Lindstedt | |
| 5,411,354 A | 5/1995 | Gustafsson | |
| 5,439,327 A | 8/1995 | Werthiem | |
| 5,743,680 A | 4/1998 | von Haas | |
| 5,803,675 A | 9/1998 | Von Haas | |
| 5,829,924 A * | 11/1998 | Oshnock et al. | 407/110 |
| 5,921,724 A | 7/1999 | Erickson et al. | |
| 5,934,843 A * | 8/1999 | Brask et al. | 407/106 |
| 5,980,165 A | 11/1999 | Hansson | |
| 6,116,823 A | 9/2000 | Mihic | |
| 6,176,649 B1 | 1/2001 | Friedman | |
| 6,234,727 B1 * | 5/2001 | Barazani | 407/117 |
| 6,241,429 B1 | 6/2001 | Schafer | |
| 6,244,790 B1 | 6/2001 | Kiingdom et al. | |
| 6,261,032 B1 | 7/2001 | Duwe et al. | |
| 6,299,388 B1 | 10/2001 | Slabe | |
| 6,572,309 B2 | 6/2003 | Hansson | |
| 6,579,044 B1 * | 6/2003 | Trenkwalder et al. | 407/110 |
| 7,104,171 B1 | 9/2006 | Long | |
| 7,121,771 B2 | 10/2006 | Englund | |
| 7,275,896 B2 | 10/2007 | Nudelman | |
| 7,300,232 B2 | 11/2007 | Wiman | |
| 7,320,564 B2 | 1/2008 | Gati | |
| 7,488,142 B2 | 2/2009 | Englund | |
| 7,578,639 B2 | 8/2009 | Wiman | |
| 7,665,933 B2 | 2/2010 | Nagaya | |
| 7,887,266 B2 | 2/2011 | Hecht | |
| 7,887,267 B2 | 2/2011 | Niemi | |
| 7,896,585 B2 | 3/2011 | Hecht | |
| 8,021,084 B2 | 9/2011 | Hecht | |
| 8,647,029 B2 * | 2/2014 | Hecht | 407/110 |
| 8,827,598 B2 * | 9/2014 | Henry et al. | 407/11 |
| 8,926,233 B2 | 1/2015 | Kaufmann | |
| 8,939,684 B2 | 1/2015 | Chistyakov | |
| 8,985,913 B2 | 3/2015 | Oren | |
| 9,168,588 B2 | 10/2015 | Kaufmann | |
| 9,242,300 B2 | 1/2016 | Kaufmann | |
| 2002/0081165 A1 * | 6/2002 | Hecht | 407/110 |
| 2003/0165362 A1 * | 9/2003 | Hecht | 407/107 |
| 2004/0151551 A1 | 8/2004 | Oettle | |
| 2005/0207854 A1 * | 9/2005 | Hecht | 407/117 |
| 2005/0232712 A1 | 10/2005 | Hecht | |
| 2005/0238444 A1 * | 10/2005 | Virtanen et al. | 407/110 |
| 2006/0269367 A1 | 11/2006 | Havrda | |
| 2008/0193231 A1 | 8/2008 | Jonsson | |
| 2008/0240874 A1 | 10/2008 | Nagaya | |
| 2009/0214305 A1 | 8/2009 | Waggle | |
| 2011/0299944 A1 | 12/2011 | Höfermann | |
| 2013/0051934 A1 | 2/2013 | Henry | |
| 2013/0058729 A1 | 3/2013 | Choi | |
| 2013/0183109 A1 | 7/2013 | Fujii | |
| 2013/0202372 A1 | 8/2013 | Hecht | |
| 2013/0236256 A1 | 9/2013 | Kaufmann | |
| 2014/0126969 A1 | 5/2014 | Törnstäm | |
| 2014/0321926 A1 | 10/2014 | Sadikov | |
| 2014/0321929 A1 | 10/2014 | Bhagath | |
| 2015/0075338 A1 | 3/2015 | Onodera | |
| 2015/0343534 A1 | 12/2015 | Kaufmann | |

FOREIGN PATENT DOCUMENTS

| | | | |
|---|---|---|---|
| CN | 1166148 A | 11/1997 | |
| CN | 101743084 A | 6/2010 | |
| CN | 201572931 U | 9/2010 | |
| CN | 201572932 U | 9/2010 | |
| DE | 1 002 587 B | 2/1957 | |
| DE | 3319799 A1 * | 12/1984 | ............. B23B 27/16 |
| DE | 3319799 C2 | 1/1989 | |
| DE | 3906822 | 9/1990 | |
| DE | 8214831 U1 | 6/1991 | |
| DE | 43 22 082 A1 | 1/1995 | |
| DE | 197 39 855 A1 | 9/1997 | |
| DE | 197 39 855 A1 | 4/1999 | |
| DE | 198 48 371 A1 | 5/2000 | |
| DE | 69608965 T2 | 12/2000 | |
| DE | 69906702 | 2/2004 | |
| DE | 102004033929 B3 | 1/2006 | |
| DE | 10 2006 055 255 A1 | 11/2006 | |
| DE | 202006011535 | 11/2006 | |
| DE | 10 2008 005 788 B3 | 1/2008 | |
| DE | 19955581 B4 | 11/2008 | |
| DE | 102012002395 A1 | 9/2012 | |
| DE | 102011053760 A1 | 3/2013 | |
| EP | 0 312 223 A1 | 4/1989 | |
| EP | 0 865 851 A1 | 9/1998 | |
| EP | 851796 | 6/2000 | |
| EP | 0865851 B1 | 9/2000 | |
| EP | 1188503 B1 | 2/2005 | |
| EP | 654316 | 10/2005 | |
| EP | 1205273 B1 | 9/2006 | |
| EP | 2082820 A2 | 7/2009 | |
| EP | 2394763 | 12/2011 | |
| JP | 58-109204 A * | 6/1983 | ............. B23B 27/14 |
| JP | 08-71810 A | 3/1996 | |
| JP | 2000-158271 A * | 6/2000 | ............... B23Q 3/12 |
| JP | 2001138106 A | 5/2001 | |
| JP | 2004-209615 A | 7/2004 | |
| WO | 97/10911 A1 | 3/1997 | |
| WO | WO9912680 A1 | 3/1999 | |
| WO | WO 99/30859 A1 * | 6/1999 | ............. B23B 27/04 |
| WO | 01/19557 A1 | 3/2001 | |
| WO | 2009/141815 A1 | 11/2009 | |
| WO | 20090141815 A1 | 11/2009 | |
| WO | 2011/087180 A1 | 7/2011 | |
| WO | 2011080734 | 7/2011 | |
| WO | 2011/128888 A1 | 10/2011 | |
| WO | WO2014003161 A1 | 1/2014 | |

OTHER PUBLICATIONS

Jul. 10, 2015 Notice of Allowance US 2014-0147219 A1
Jul. 15, 2015 Office action (3 months) 1 US 2014-0161547 A1
Oct. 1, 2015 Notice of Allowance US 2014-0161547 A1
DE 102012004804, Jan. 19, 2016 Opposition DE 102012004804.
May 15, 2016—First_CN_Office_Action_and_EN_Translation-K-4102-CN-NP_2013100648518.
Apr. 6, 2016—Non-Final_Office_Action-K-05921-US-NP_US14289116.

* cited by examiner

GROOVE INSERT, CLAMPING HOLDER FOR A GROOVE INSERT AND GROOVE CUTTING TOOL

CLAIM TO PRIORITY

This application is a National entry application of German Application No. 102012004804.1, filed on Mar. 9, 2012, the entire contents of which is incorporated herein by reference.

FIELD OF THE INVENTION

The invention relates to a groove insert to be received in a clamping holder, said groove insert having two opposite ends, wherein the insert has on one end a front side which forms the main free face and on the opposite end a rear side which extends substantially parallel to the front side, and having a top and a bottom side as well as side faces, wherein a major edge is formed between the front side and the top side.

Over and above this, the invention relates to a clamping holder having a receiving means for a groove insert as well as to a groove cutting tool having a clamping holder and a groove insert, which is detachably fastened thereon.

BACKGROUND OF THE INVENTION

Groove inserts are installed in lathe tools or also in milling cutters as a replaceable unit in order to be replaced in the event of wear. Groove inserts are extremely narrow items to be installed such that their secure fastening in the clamping holder has to be ensured. This can cause problems precisely where there is a lateral feed.

EP 0 865 851 B1 makes known an indexable insert which is fastened in a recess in the clamping holder. For stable positioning, the indexable insert has a V-shaped recess on its bottom side as well as a corresponding recess on the top side. Finally, an additional recess, into which a V-shaped projection on the edge of the receiving means in the clamping holder projects, is also included underneath the main free face. An eccentric profile roller presses from above into the top holding structure.

U.S. Pat. No. 5,411,354 shows a non-indexable groove insert, where the top side and the bottom side each have a V-shaped recess. A complementarily formed continuation of the clamping jaw is pressed into the top holding structure, and a separate rail, which is screwed on a planar face of the carrier of the clamping holder, is pressed into the bottom holding structure. The planar rear side of the groove insert is spaced somewhat from the opposite wall in the clamping holder.

DE 10 2006 055 255 A1 describes an L-shaped insert, where the clamping face is realized on the top side of the vertical portion of the "L". The rear side of the vertical, L-shaped portion merges into the horizontal portion and has a groove which merges into a groove on the top side of the horizontal portion. Over and above this, the bottom side is also provided with a groove. The lengthwise positioning of the groove insert in the clamping holder is effected by means of the rear side of the vertical portion, whereas the rear-side end of the insert is at a spacing from the opposite wall in the clamping holder. A large lateral bore is provided in said region.

A further insert and a further clamping holder for said further insert are described in DE 696 08 965 T2. In this case, the insert is provided with a V-shaped groove on its top side and its bottom side. The rear side is planar, an oblique face which extends at approximately 45°, and is also provided with a V-shaped groove, being present between the rear side and the bottom side. Said oblique face forms the axial stop for the insert.

SUMMARY OF THE INVENTION

It is the object of the invention to create a groove insert which can be anchored in an even better manner in the receiving means, a correspondingly realized clamping holder as well as a groove cutting tool which ensures perfect positioning and mounting of the groove insert in the receiving means even in the case of a lateral feed.

The groove insert as claimed in the invention is provided to be received in a tool holder, said groove insert having two opposite ends, wherein on one end the insert has a front side which forms the main free face and on the opposite end a rear side, which extends substantially parallel to the front side, and has a top and a bottom side as well as side faces, and wherein the major edge is formed between the front side and the top side. The groove insert as claimed in the invention has, along the top and the bottom side and along the entire rear side, parallel holding faces which, when viewed in cross section, in each case taper toward one another to form a top, bottom or rear holding structure, by way of which the insert is mounted in a positive locking manner on the tool side.

The groove insert as claimed in the invention is distinguished by particularly long holding faces, which form prism-like holding structures. Said holding structures are provided on the top and on the bottom side, above all, however, also on the rear side. The rear side is not realized in a planar manner, as in the case of many groove inserts as claimed in the prior art, but also has tapering, parallel holding faces. By realizing the holding faces on the rear side and not on an intermediate face such as an L-shaped portion or on an oblique face, a particularly good lever arm is also produced when fixed in a positive locking manner in the holder, which increases stability. The groove insert as claimed in the invention is namely held on the outermost ends. Over and above this, the tapering, parallel holding faces also extend over the entire rear side. The holding structures produce longitudinal grooves or longitudinal ribs such that a groove and tongue connection is created.

The holding faces extend along the top, the bottom and the rear side, that is parallel to the edges which are formed in each case between the top and the bottom side, the rear side and the corresponding side faces.

In a preferred manner, at least some holding structures are realized as convex longitudinal ribs. In particular, however, all the holding structures are realized as convex longitudinal ribs. Convex longitudinal ribs on the insert as opposed to a concave, groove-like indentation have the following advantage. The groove insert is realized from hard and consequently pressure sensitive material, whereas the clamping holder is usually produced from softer, tougher material. If the groove insert has a convex longitudinal rib which is then received in a complementarily formed V-shaped groove in the holder, only compressive stress is exerted on the groove insert in the region of said holding structure.

To save material when producing the groove insert, said groove insert preferably has a central longitudinal groove at least in one of the longitudinal ribs. Said longitudinal groove in the region of the center of the longitudinal rib or longitudinal ribs does not reduce the stability for positionally fixing the groove insert or does not reduce it appreciably. However, the groove itself reduces the material necessary for producing the produced groove insert (usually sintered material), such that the production price thereof is able to be reduced. In this context, it is preferred for the longitudinal groove to extend over the entire length of the rib.

All the holding structures, that is on the top, the bottom and on the rear side, should be realized with the identical cross section. This reduces production expenditure on the groove insert, above all, however, on the production of the corresponding, complementary counter profile on the clamping holder. When realizing the same holding structure on the three faces, the edge of the receiving means in the clamping holder, into which the groove insert is inserted, can be generated using the same profiling cutter, preferably even in only one processing step.

The bottom holding structure should extend over the entire length of the bottom side in order to fix the groove insert in an optimum manner in the clamping holder.

As far as the top holding structure is concerned, the same should extend over the entire length of the top side, as far as up to the chip-deflecting regions, in this case the clamping face and projections, which are present where applicable, for chip breaking.

It likewise serves for reducing the material when producing the groove insert when the transition from the top to the rear side and/or from the rear side to the bottom side is realized as a capped corner. Said corner can be rounded or chamfered, for example, it being generated by means of the pressing tool.

The insert should increase in height toward the rear side and/or the top and the bottom holding structure should diverge in the direction of the rear side by up to 5°. It is preferred when the top and bottom holding structure diverge within the range of between 3° and 5°, toward the rear side. The achievement resulting from constructing the insert so as to be higher toward the rear side in this manner is that the insert is better mounted in the clamping holder during the cutting process. When, above all, the clamping jaw presses from above against the top side, the wedge effect generates a force component which endeavors to press the groove insert in the direction of the rear side into the receiving means on the clamping holder side. This is then a counter force to the cutting force which occurs at the main edge when groove cutting.

Where a clamping jaw is realized as a separate part in relation to the carrier, the angle can be greater than 5°.

Over and above this, the front and rear side should taper toward one another in the direction of the top side by up to 10°, preferably up to 5°. This slight non-parallelism is acceptable and is still included in the term "substantially parallel". The slight angularity of the front and of the rear side with respect to one another is brought about by the fact that the main free face should be slightly overhanging toward the main edge, whereas the rear side should rather extend vertically with respect to the feed direction in order to provide a good hold in the clamping holder.

Over and above this, the invention also relates to a clamping holder having a receiving means for a groove insert as claimed in the invention, said clamping holder having a carrier and a clamping jaw, which abuts flat against the top holding structure of the insert and is preferably pressed against the top holding structure of the insert by way of a clamping means. The clamping holder has a rear and a bottom holding structure which abut flat against the corresponding holding structures on the insert side, wherein the rear and the bottom holding structure are a one-piece component of the carrier.

The clamping holder as claimed in the invention ensures the groove insert is anchored well in the receiving means in the clamping holder. Corresponding, complementary holding structures are present on the clamping holder, more precisely on the edge which surrounds the receiving means, such that long holding faces are present here. The clamping jaw itself also lies flat and not in a linear or point-to-point manner against the top holding structure of the groove insert and consequently has an elongated top holding structure on the clamping holder side.

The carrier has a front face which adjoins the main free face of the insert and can extend at an angle of between 0° and 10° with respect to the rear holding structure on the carrier side. The result of said substantially parallel realization is that the rear-side holding structure on the clamping holder side also extends substantially parallel to the main free face in order to provide a sturdy mounting for the insert.

Over and above this, it is advantageous when the carrier has a front face which adjoins the main free face of the insert and the bottom holding structure encloses an angle with the front face of between 80° and 100°, preferably less than 90°. This means that the bottom holding structure on the clamping holder side, when viewed from the side, extends upward somewhat to the front face, which improves the secure, positionally fixed mounting of the groove insert.

Another definition of said structure consists in that the carrier has a bottom supporting face and the bottom holding structure in the carrier extends proceeding from the front face in an oblique manner in the direction of the supporting face (preferably at an angle of up to a maximum of 5°). The supporting face is the bottom side of the carrier opposite the clamping jaw.

The top and the bottom holding structure on the clamping holder should taper toward one another from the rear side in the direction of the front face, preferably at a maximum angle of 5°. The hold of the insert in the clamping holder is also improved by said geometry.

To produce the clamping holder in a simple manner, the holding structures provided on said clamping holder are aligned laterally with respect to one another. This means that the corresponding holding structures, when viewed in front view, are not offset laterally with respect to one another. Consequently, it is possible as claimed in the preferred embodiment, to generate the holding structures on the clamping holder or at least on the carrier of the clamping holder if the clamping jaw should be realized as a separate part, in one processing step by a double equal-angle milling cutter which then carries out a U-shaped movement path and at the same time generates the V-shaped groove. Naturally, it would also be possible to provide the groove on the groove insert and longitudinal ribs, which are realized in the manner of a prism, on the clamping holder.

The top, the bottom and the rear-side holding structure should merge into one another on the clamping holder in order to maximize the length of the holding structures.

The top and rear-side holding structure should extend, over and above this, over the entire length of the edge of the clamping holder which defines the receiving means. This also maximizes the length of the holding faces and the lever arms.

When the clamping jaw extends in the direction toward the front face in an oblique manner in the direction of a plane which is defined by the bottom holding structure, when viewed in side view "downward" in the direction of the front face, the clamping jaw, when pressing onto the top side, generates a force component which is directed to the rear side.

Simple production as well as maximizing the lengths of the holding structures is achieved when the receiving means is realized without any corner holes in the region between the rear-side holding structure and the top and/or bottom holding structure. In the case of clamping holders up to now, corner holes have been usual for producing the structures. The invention avoids such corner holes as claimed in one embodiment.

The clamping means should be a clamping screw, having a head and a bottom side of the head. The clamping jaw has a contact face which is opposite the bottom side of the head. The contact face extends in an oblique manner with respect to the bottom side of the head such that a clamping force is generated with a force component which is directed in the direction of the rear side. As a result, in the normal case the head does not abut against the clamping jaw over its entire surface, but rather in an eccentric manner by way of an edge portion in order to generate more additional torque, which increases the holding force in the direction of the rear side of the groove insert.

Finally, the present invention also relates to a groove cutting tool for turning or milling, said groove cutting tool having a clamping holder as claimed in the invention and having a groove insert which is detachably fastened in the receiving means of the clamping holder.

The groove insert as claimed in the invention is not an indexable insert, for its entire rear side is realized as a holding structure.

BRIEF DESCRIPTION OF THE DRAWINGS

Further features and advantages of the invention are produced from the following description and from the following drawings, to which reference is made. The drawings are as follows.

DETAILED DESCRIPTION OF THE INVENTION

Figure 1:
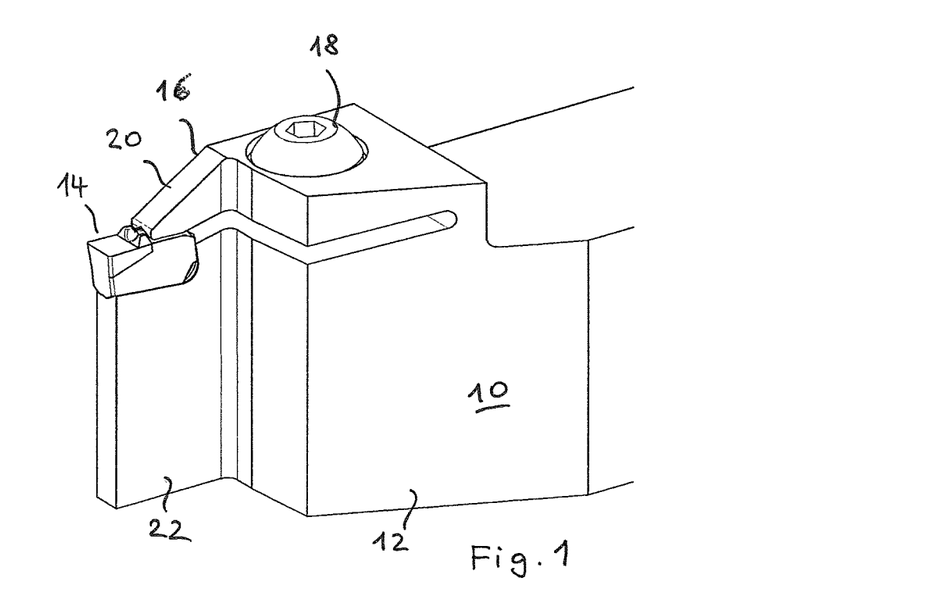
FIG. 1 shows a perspective view of a first embodiment of the groove cutting tool as claimed in the invention having a groove insert as claimed in the invention and a clamping holder as claimed in the invention.

FIG. 1 shows a groove cutting tool, for example for cutting grooves. The groove cutting tool includes a clamping holder 10, which has a carrier 12 for a groove insert 14 and a clamping jaw 16 which is integrally molded on the carrier 12. The clamping jaw 16 has on its top side a through-opening, through which a clamping means 18 in the form of a clamping screw extends as far as into the carrier 12, where a thread is realized (see FIG. 7).

The clamping jaw 16 presses from above onto the insert 14 and clamps said insert between itself and the carrier 12.

It can be seen in FIG. 1 that the width of the groove insert 14 is the same as or ever greater than the width of a narrow arm 20 of the clamping jaw 16 and greater than the width of a narrow web 22 of the carrier 12, both of which come directly into contact with the groove insert 14. The tool is able to cut deeply into a workpiece by means of the narrow embodiment of the arm 20, the web 22 and the groove insert 14.

It can be seen with reference to FIG. 2 that the clamping holder 10 has a bottom side, referred to below as bottom supporting face 24. By way of said face 24, the clamping holder 10 abuts against a tool holder, for example the lathe.

A front face 26, to which the so-called main free face 28 of the insert 14 connects toward the top, extends substantially vertically with respect to the bottom contact face 24. The main free face 28 protrudes forward somewhat and is angled with respect to the so-called main edge 30. The main edge 30 is also called the main cutting edge.

Figure 2:
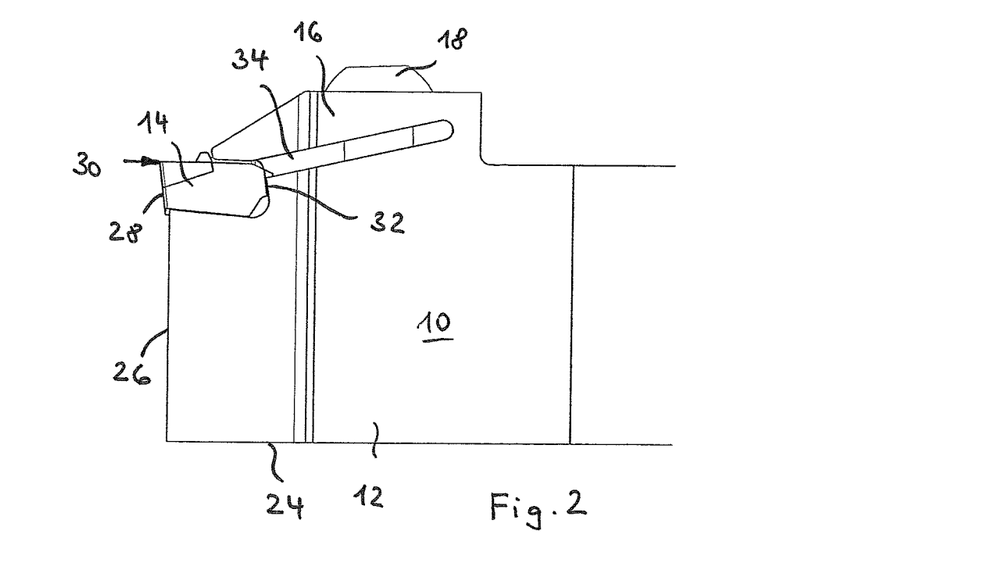
FIG. 2 shows a perspective view of a first embodiment of the groove cutting tool as claimed in the invention having a groove insert as claimed in the invention and a clamping holder as claimed in the invention.

It can also easily be seen from FIG. 2 that the clamping holder 10 is divided by a slot 34, which extends upward obliquely from the so-called rear side 32 of the insert 14, into the carrier 12 and the clamping jaw 16. The slot 34 runs out from the top end of the rear side 32.

The insert 14 has two ends, also called longitudinal ends. The one end is the front side, which is defined by the main free face 28, the opposite end is defined by the rear side 32 (see FIG. 3). The top side 36 opposite the supporting face 24 includes three portions, namely a front portion 38, which proceeds from the main edge 30 to an optional continuation 40, which can be provided for chip breaking, and a holding portion with a top holding structure 42.

Figure 3:
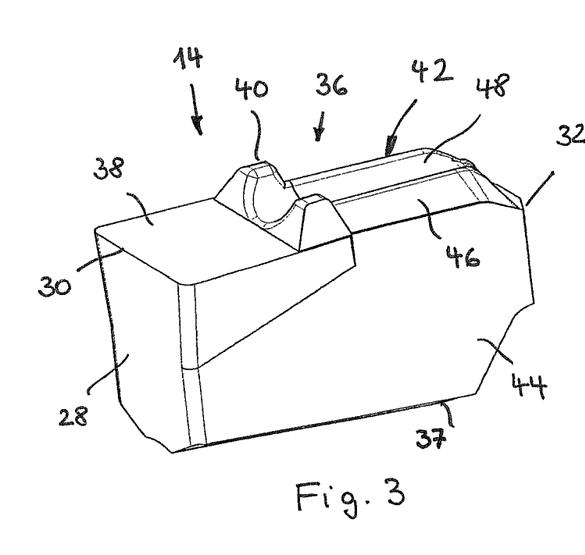
FIG. 3 shows a perspective view of the groove insert as claimed in the invention shown in FIG. 1.

The holding structure 42 includes holding faces 46 which proceed from opposite side faces 44 and taper obliquely upward and toward one another.

The holding faces 46 are preferably realized flush, which also applies to the following remaining holding faces on the clamping holder 10 and on the groove insert 14 which are also explained.

A type of convex longitudinal rib is produced by the holding faces 46 which extend upward and toward one another. Said longitudinal rib can also be designated as a type of prism.

As an option, this is not absolutely necessary, the longitudinal rib has a preferably central longitudinal groove 48 which extends over the entire length of the longitudinal rib 46 and through the continuation 40. The longitudinal groove 48 serves, on the one hand, to reduce expenditure on material and, on the other hand it can be used as a cooling channel. Said cooling channel is supplied with coolant or even gas by means of one or several corresponding bores 50 (see FIG. 7) in the clamping jaw 16 or the carrier 12.

The holding faces 46 form a conical, top holding structure 42, which extends over the entire top side 36, with the exception of the chip-guiding portions.

Figure 4:
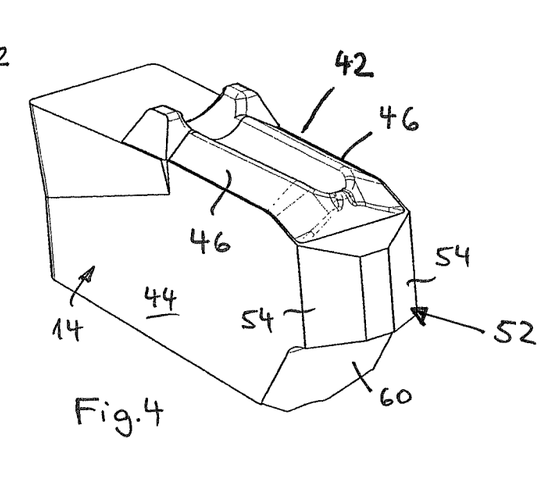
FIG. 4 shows a perspective view of the groove insert according to FIG. 3 from obliquely behind.

The rear side 32 is also provided with a holding structure 52 (called the rear-side holding structure). Said holding structure 52 is also defined by two holding faces 54 which taper toward one another and are flush. The holding structure 52 extends over the entire length of the rear side. The rear side is defined by the rear-side end of the insert 14. The form of the holding structure 52 is consequently also realized as a type of longitudinal rib.

A bottom holding structure 55, which is formed by two holding faces 56 which taper toward one another (see FIG. 5), also extends over the entire length of the bottom side 37. The form of a longitudinal rib is also produced in this case.

All the holding faces 46, 54, 56 extend along their corresponding faces, for the top and bottom holding faces 46 and 56 this means in the direction from the front to the rear end and for the rear-side holding faces 54 it means upward.

Figure 5:
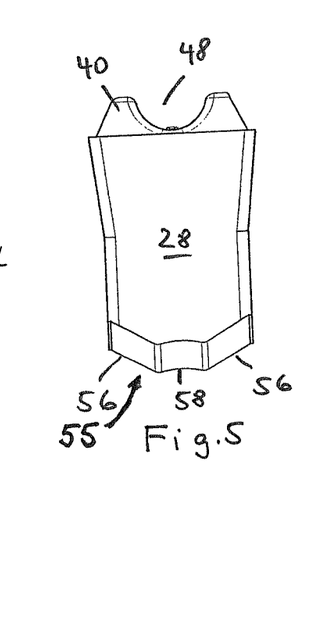
FIG. 5 shows a front view of the groove insert according to FIG. 3.

It can be seen in FIG. 5 that, similarly as the top holding structure 42, the bottom holding structure 55 also has a central longitudinal groove 58 to save on material.

Figure 6:
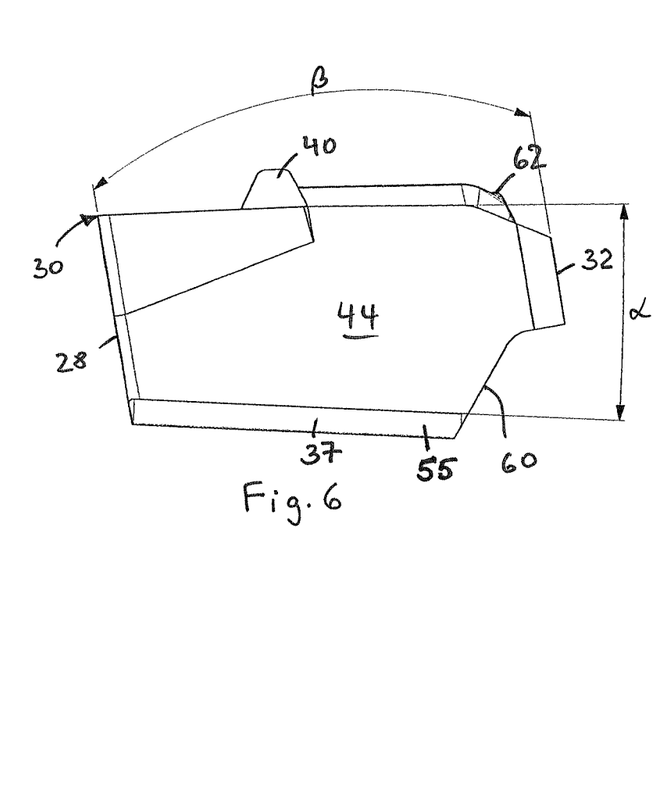
FIG. 6 shows a side view of the groove insert according to FIG. 3.

FIG. 6 shows that the transitions from the top side to the rear side 36 and 32 and from the bottom side 37 to the rear side 32 are realized as capped corners. Said capping of each corner shortens the length of the rear side 32, material saving being connected thereto. This also serves as an ejector contact face.

The capped bottom corner is formed by a flush face 60 which extends obliquely upward and in the region of its top end opens out into a face which extends obliquely to the rear.

The capped top corner is formed by a rounding 62 which ends, however, before reaching the rear side 32.

It can also easily be seen in FIG. 6 that the groove insert 14 increases slightly in height continuously from the main free face 28 to the rear side 32. The top and the rear side consequently enclose an angle $\alpha$ of up to 5°, preferably of between 3° and 5°. Once the holding faces 46 and 56 are preferably the same height over the length, the angle $\alpha$ can be measured either on the outer ends of the holding structures or, as shown in FIG. 6, at the start of the holding faces 46, 56, that means adjoining the respective side face 44.

The front side with its main free face 28 and the rear side 32 are substantially parallel to one another. This definition includes a slight angular deviation of up to 10° (see angle $\beta$ in FIG. 6), at which the main free face 28 and the rear side 32 taper toward one another in the direction of the top side 36.

In side view the basic form of the insert 14 with the exception of the capped corners is substantially a parallelogram.

Figure 7:
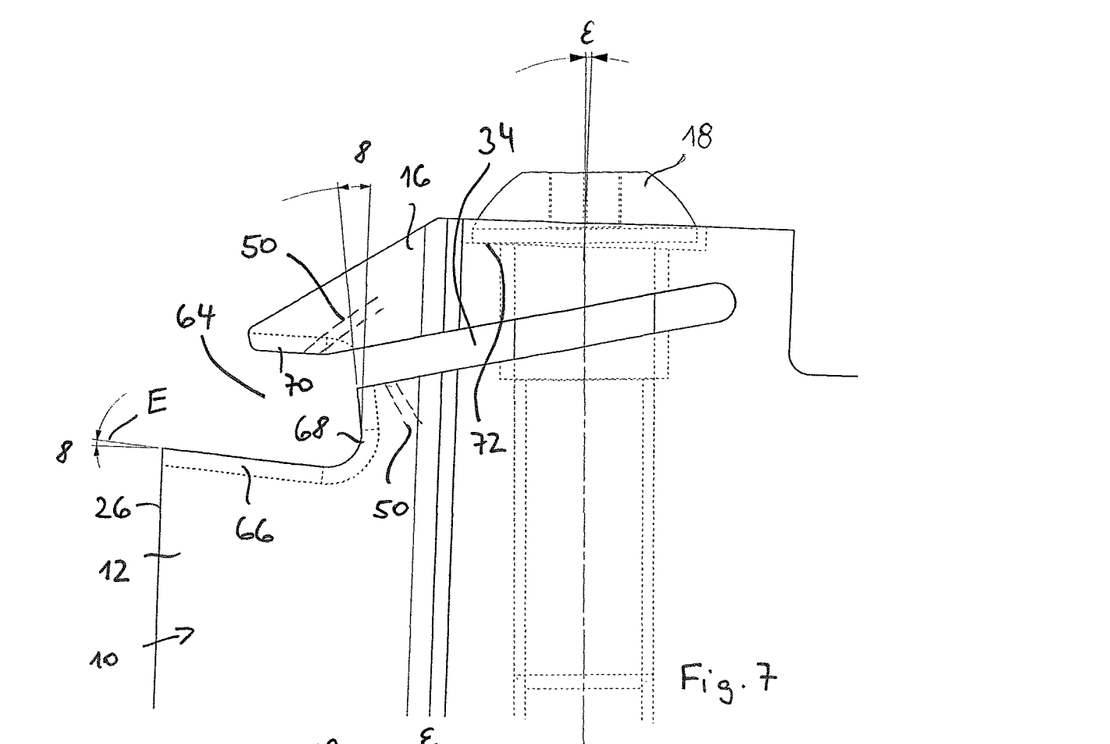
FIG. 7 shows a side view of the clamping holder as claimed in the invention, which can be seen in FIG. 1.

FIG. 7 shows the receiving means 64 in the clamping holder 10 formed between the clamping jaw 16 and the carrier 12.

The edge of the clamping holder 10 which defines the receiving means 64 is realized with a circumferential holding structure which is realized in a complementary manner to the holding faces 46, 54 and 56. This means that the bottom holding structure 66 on the carrier 12 is realized as a V-shaped groove, having two oblique faces or holding faces which taper toward one another and abut over the entire area against the bottom holding structure 55 of the insert 14 and consequently over the entire area against the holding faces 46. The bottom holding structure 66 merges into the rear holding structure 68 in a radius. The rear holding structure 68, after this, that is after bridging the slot 34, merges into a top holding structure 70 which is realized on the bottom side of the clamping jaw 16.

All the holding structures 66, 68, 70 have the same cross section and are aligned with respect to one another such that they can be generated by a double equal-angle milling cutter which runs through a U-shaped movement path.

As can also be seen from FIG. 7, the top, the bottom and the rear side holding structure 70, 66 or 68 consequently extend over the entire edge of the receiving means 64.

As a result of the slot 34 which is directed obliquely upward, the clamping jaw 16 extends obliquely downward in the direction of the front face 26, that is toward a plane E which is defined by the bottom holding structure 66.

The receiving means 64 is realized so as to be completely free of corner holes, that means that no corner hole is present in the region between the rear-side holding structure 68 and in each case the top and bottom holding structure 70 or 66.

The bottom holding structure 66 with its holding faces extends in side view (see FIG. 7) proceeding from the front face 26 at an angle of less than 90° in the direction of the rear holding structure 68. This means that the angle $\gamma$ between the plane E and a perpendicular onto the front face 26 is greater than 0. The angle $\gamma$ is a maximum of 5°.

The rear holding structure 68 extends either perpendicular with respect to the bottom supporting face 24 and/or parallel to the front face 26 or, as shown in FIG. 7, inclined slightly forward, that is inclined forward at an angle $\delta$ of up to 5°, preferably within the range of between 3° and 5° upward and in relation to the perpendicular onto the supporting face 24 or to a parallel plane with respect to the front face 26.

The clamping means 18 preferably does not extend parallel to the front face 26 and perpendicular to the bottom supporting face 24, but is slightly inclined away from the front face 26 (see FIG. 7). The corresponding angle of inclination $\epsilon$ is preferably between 2° and 5°.

Figure 8:
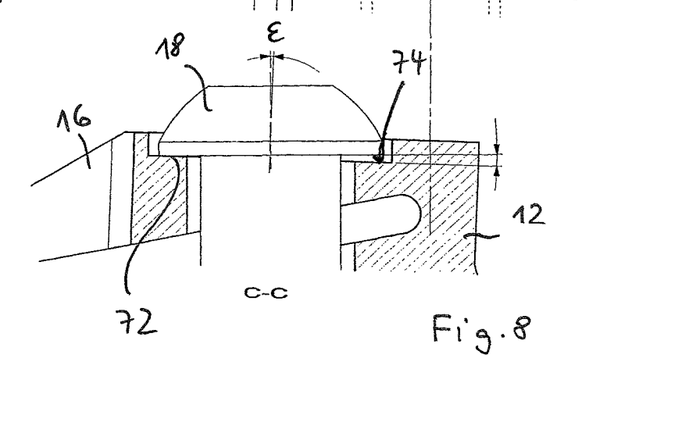
FIG. 8 shows an enlarged sectioned view of a detail of the clamping holder according to FIG. 7 in the region of the clamping means.
Figure 9:
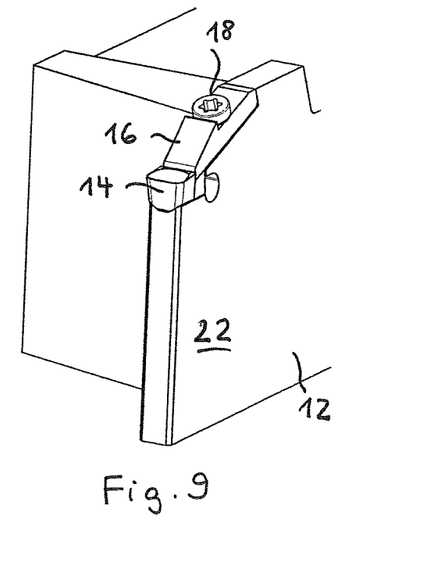
FIG. 9 shows a perspective view of a second embodiment of a groove cutting tool as claimed in the invention.
Figure 10:
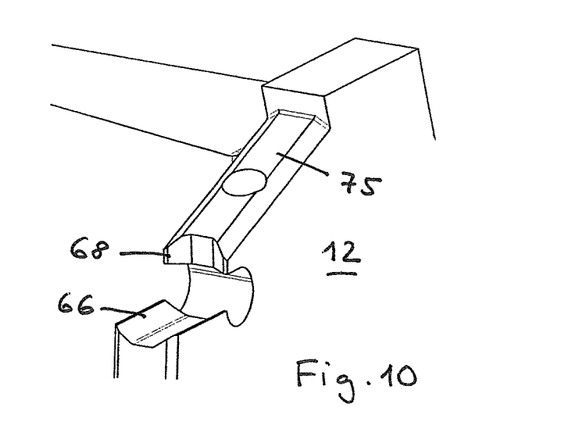
FIG. 10 shows the carrier of the clamping holder shown in FIG. 9, without a clamping jaw, as claimed in a second embodiment of the clamping holder as claimed in the invention.

Said inclination is present so that the underside 72 of the head only abuts against a contact face 74 on the top side of the clamping jaw 16 in the region of its front end, that is in the region of the end close to the front face 26. This consequently ensures that once the clamping jaw 16 is bent downward, a force component is always exerted onto the clamping jaw 16 by the clamping means 18, which is slightly inclined in the direction of the rear side 32 and consequently has a force component into said direction. Over and above this, once the clamping jaw 16 is bent, it is also ensured that the clamping means 18 exerts a good lever arm onto the clamping jaw 16 and consequently a good clamping force by the contact being located a long way forward, that is closer to the front face 26.

The embodiment according to FIGS. 9 to 15 corresponds substantially to the one described beforehand such that only the differences have still to be discussed below.

Figure 11:
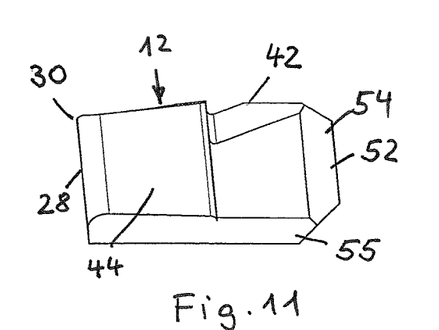
FIG. 11 shows a side view of a second embodiment of the groove insert as claimed in the invention.
Figure 12:
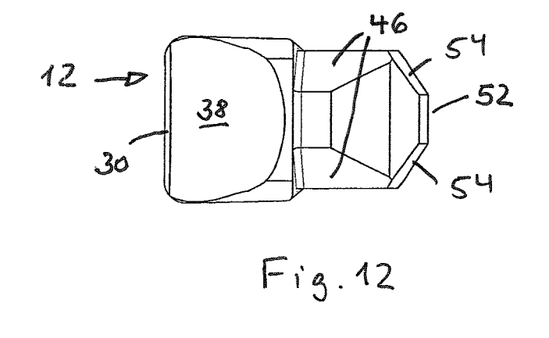
FIG. 12 shows a top view of the groove insert according to FIG. 11.
Figure 13:
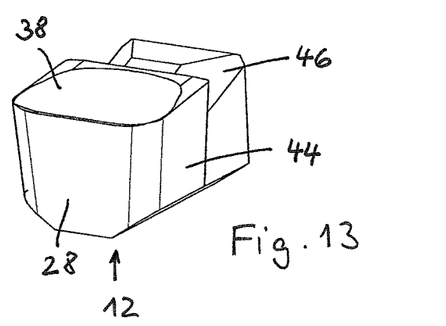
FIG. 13 shows a perspective front view of the groove insert according to FIG. 11.

In the case of said embodiment also, the briefly detailed groove insert 14 has along the bottom side, along the entire rear side and on the top side, in the region of the non-chip-guiding faces, holding faces 46, 54 and 56 which taper toward one another, are aligned with respect to one another and which form corresponding longitudinal rib-like holding structures 42, 52, 55.

In the case of said embodiment, the corners in the transition between the top side and the bottom side are also capped in each case to the rear side, in this case by a level chamfer of between 30° and 45°.

In the case of said embodiment, the groove insert 14 also increases slightly in height toward the rear side 32, and in the installed state the bottom side extends slightly downward and obliquely rearward.

As a difference to the previous embodiment, however, the clamping jaw 16 is realized as a separate part which is fastened on the carrier 12 by means of a clamping means 18. To this end, the carrier 12 (see FIG. 10) has a prism-like contour 75 along the supporting face for the clamping jaw 16, and the clamping jaw has a counter contour on its bottom side in order to ensure a precise alignment between the clamping jaw 16 and the carrier 12.

As a result of the separate clamping jaw 16, it is possible for the top and bottom side 36 and 37 to diverge by more than 5° with respect to the rear side 32

Figure 15:
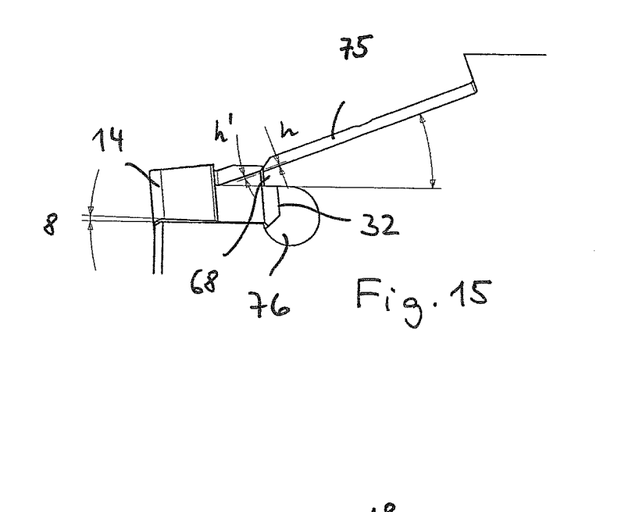
FIG. 15 shows an enlarged view of a detail of the groove cutting tool as claimed in the invention according to FIG. 9 without a clamping jaw.
Figure 16:
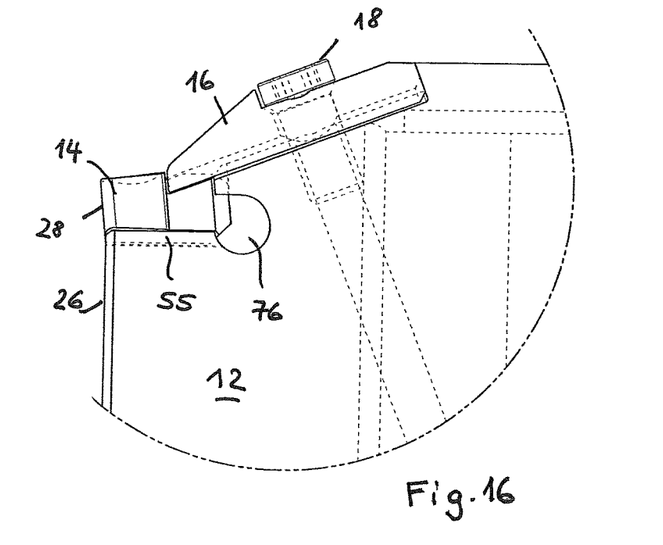
FIG. 16 shows an enlarged side view of the groove cutting tool according to FIG. 9 in the region of the groove insert.

In contrast to the preceding embodiment, a corner hole 76 is present at the transition between the bottom holding structure 66 and the rear holding structure 68 in the carrier 12 (see FIG. 15).

In order to ensure that a permanent clamping force, above all a clamping force with a component which is directed in the direction of the rear side 32, is exerted onto the insert 14 by the clamping jaw 16, a vertical offset is present between the top holding structure 42, which is directed obliquely upward, on the insert 14 and the contour 75. Said vertical offset is shown in FIG. 14 by the gap h.

Figure 14:
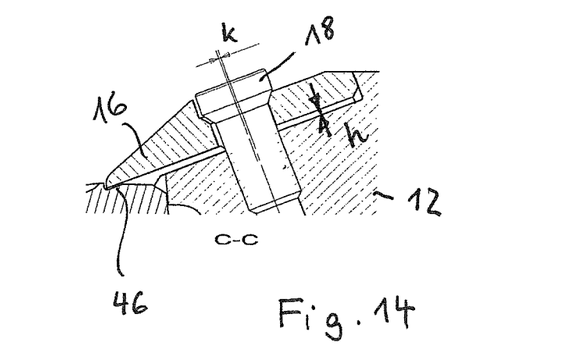
FIG. 14 shows an enlarged sectioned view through the groove cutting tool as claimed in the invention according to FIG. 9 in the region of the clamping means.

Over and above this, it can be seen in FIG. 14 that the longitudinal axis of the clamping means 18 is realized slightly offset or tilted with respect to the corresponding opening in the clamping jaw 16 (see offset or angular offset K), such that it is ensured that the clamping means 18 presses by way of its rear-side end against the edge of the opening in the clamping jaw 16. This consequently creates a force component which endeavors to press the clamping jaw 16 obliquely to the right, that is away from the front face 26 and upward.

FIG. 15 shows the vertical offset h between the corresponding supporting face on the top side 36 of the groove insert 14 and the contour 75 for the clamping jaw 16 on the carrier.

The cross-sectional geometries of the contour 75 and of the top holding structure 70 on the groove insert 14 are realized in an identical manner.

The rear holding structure 68, into which the corresponding holding structure 52 in the groove insert 14 penetrates and is mounted in a positive locking manner, is realized below the contour 75 on the carrier 12.

In the case of said embodiment, the groove insert 14 is not realized as an indexable insert either, so that the length of the back or rear holding structure 52 is as long as possible. Neither is there any other geometry present on the groove insert 14 in the region of the holding structure 52, which simplifies the production thereof.

What is claimed is:

1. A groove insert to be received in a clamping holder, comprising:
    two opposite ends, wherein one end is a front side defined by a main free face and the opposite end defined by a rear side, which extends substantially parallel to the front side;
    a top side, a bottom side, and a plurality of side faces, wherein a major edge formed at an intersection between the front side and the top side, and wherein the top side includes a top holding structure having a pair of holding faces that taper toward one another to form a longitudinal rib having a central, longitudinal groove therebetween, and wherein the bottom side includes a bottom holding structure having a pair of holding faces that taper toward one another to form a longitudinal rib having a central, longitudinal groove therebetween, and wherein the rear side includes a rear holding structure having a pair of holding faces that taper toward one another, and wherein the top holding structure, the bottom holding structure and the rear holding structure enable the groove insert to be securely mounted in a clamping holder.

2. The groove insert as claimed in claim 1, wherein the bottom holding structure extends over the entire length of the bottom side.

3. The groove insert as claimed in claim 1, wherein the top side further includes a front portion extending from the main edge to a continuation, and wherein the top holding structure extends from the rear side to the continuation.

4. The groove insert as claimed in claim 3, wherein the central, longitudinal groove of the top holding structure extends through the continuation.

5. The groove insert as claimed in claim 1, wherein the top holding structure and the bottom holding structure diverge in the direction of the rear side.

6. The groove insert as claimed in claim 1, wherein the front side and the rear side taper toward each other by up to 10° in the direction of the top side.

7. A clamping holder having a receiving means for a groove insert as claimed in claim 1, said clamping holder comprising a carrier and a clamping jaw having a bottom side with a top holding structure, which abuts the top holding structure of the groove insert and can be pressed against the top holding structure of the groove insert by way of a clamping means, the carrier further comprising a rear holding structure, which abuts the rear holding structure of the groove insert, and a bottom holding structure, which abuts the bottom holding structure of the groove insert, wherein the rear holding structure and the bottom holding structure are a one-piece component of the carrier.

8. The clamping holder as claimed in claim 7, wherein the carrier has a front face, and wherein the rear holding structure extends at an angle of between 3° and 5° with respect to a plane parallel to the front face.

9. The clamping holder as claimed in claim 7, wherein the carrier has a front face, and wherein the bottom holding structure on the carrier forms an angle of less than 90° with respect to the front face of the carrier.

10. The clamping holder as claimed in claim 7, wherein the top holding structure of the clamping jaw and the bottom holding structure on the carrier continuously extend toward one another in the direction of the front face from the rear side.

11. The clamping holder as claimed in claim 7, wherein the top holding structure, the bottom holding structure and the rear holding structure merge into one another to define a receiving means for the insert.

12. The clamping holder as claimed in claim 7, wherein the carrier has a front face and wherein a slot disposed between the carrier and the clamping jaw extends obliquely upward with respect to a plane that is perpendicular to the front face.

13. The clamping holder as claimed in claim 12, wherein the clamping jaw extends obliquely downward in the direction of the front face.

14. The clamping holder as claimed in claim 7, wherein the clamping means is a clamping screw with a head having an underside, wherein a contact face which is opposite the underside of the head is provided on the clamping jaw and the contact face extends in an oblique manner with respect to the underside of the head such that a clamping force is generated with a force component which is directed in the direction of the rear side.

15. A groove cutting tool, comprising:
a clamping holder having a carrier and a clamping jaw having a bottom side with a top holding structure, the carrier further comprising a rear holding structure, and a bottom holding structure which abuts the bottom holding structure of the groove insert, wherein the rear holding structure and the bottom holding structure are a one-piece component of the carrier; and
a groove insert received in the clamping holder, said groove insert having two opposite ends, wherein one end is a front side defined by a main free face and the opposite end defined by a rear side, which extends substantially parallel to the front side; a top side, a bottom side, and a plurality of side faces, wherein a major edge formed at an intersection between the front side and the top side, and wherein the top side includes a top holding structure having a pair of holding faces that taper toward one another to form a longitudinal rib having a central, longitudinal groove therebetween, and wherein the bottom side includes a bottom holding structure having a pair of holding faces that taper toward one another to form a longitudinal rib having a central, longitudinal groove therebetween, and wherein the rear side includes a rear holding structure having a pair of holding faces that taper toward one another,
wherein the top holding structure of the clamping jaw abuts the top holding structure of the groove insert when the groove insert is received in the clamping holder, and
wherein the rear holding structure of the carrier abuts the rear holding structure of the groove insert when the groove insert is received in the clamping holder, and
wherein the bottom holding structure of the carrier abuts the bottom holding structure of the groove insert when the groove insert is received in the clamping holder.

16. The groove cutting tool as claimed in claim 15, wherein the top side of the groove insert further includes a front portion extending from the main edge to a continuation, and a top holding structure extending from the rear side to the continuation.

17. The groove cutting tool as claimed in claim 16, wherein the longitudinal groove extends through the continuation.

18. The groove cutting tool as claimed in claim 15, wherein the top holding structure of the insert and the bottom holding structure of the insert diverge in the direction of the rear side of the insert.

19. The groove cutting tool as claimed in claim 15, wherein the front side of the insert and the rear side of the insert diverge with respect to each other by up to 10° in the direction of the top side of the insert.

20. The groove insert as claimed in claim 1, further comprising a flush face extending obliquely upward from the bottom side and having a top portion that opens outwardly and obliquely to the rear side, and a rounding extending between the top side and the rear side, wherein the flush face and the rounding shortens a length of the rear side.

21. The groove insert as claimed in claim 1, wherein the top and bottom holding structures are identical in shape.

* * * * *